(12) United States Patent
Luo (10) Patent No.: US 9,152,020 B2
(45) Date of Patent: Oct. 6, 2015

(54) ADDITIONAL KNURLED RING FOR OPTICAL LENS

(75) Inventor: Jin Luo, Luzhou (CN)

(73) Assignee: SHENZHEN PCHOOD TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/009,108

(22) PCT Filed: Dec. 8, 2011

(86) PCT No.: PCT/CN2011/083690
§ 371 (c)(1),
(2), (4) Date: Sep. 30, 2013

(87) PCT Pub. No.: WO2012/136068
PCT Pub. Date: Oct. 11, 2012

(65) Prior Publication Data
US 2014/0016920 A1    Jan. 16, 2014

(30) Foreign Application Priority Data

Apr. 2, 2011 (CN) .......................... 2011 1 0084198
Apr. 2, 2011 (CN) .......................... 2011 2 0096648

(51) Int. Cl.
*G03B 17/56* (2006.01)
*G03B 13/32* (2006.01)
*G02B 7/10* (2006.01)

(52) U.S. Cl.
CPC ................ *G03B 17/568* (2013.01); *G02B 7/10* (2013.01); *G03B 13/32* (2013.01)

(58) Field of Classification Search
CPC .................................................. G03B 17/568

USPC .......................................................... 396/144
See application file for complete search history.

(56) References Cited

U.S. PATENT DOCUMENTS

| | | | | |
|---|---|---|---|---|
| 3,626,597 A | * | 12/1971 | Darrah | |
| 3,772,978 A | * | 11/1973 | Mito | 359/701 |
| D374,878 S | * | 10/1996 | Palmer | D16/130 |
| 5,758,209 A | * | 5/1998 | Rogers | 396/103 |
| 7,161,749 B2 | * | 1/2007 | Sakurai et al. | 359/818 |
| 7,400,802 B2 | * | 7/2008 | Wyatt et al. | 385/52 |
| D629,496 S | * | 12/2010 | Madara et al. | D23/262 |
| 8,006,430 B2 | * | 8/2011 | Wang | 42/125 |

(Continued)

*Primary Examiner* — Clayton E Laballe
*Assistant Examiner* — Linda B Smith
(74) *Attorney, Agent, or Firm* — Raymond Y. Chan; David and Raymond Patent Firm (57) ABSTRACT

An additional knurled ring for an optical lens is composed of an annular portion and teeth distributed in a radial direction around the outside of the annular portion. The inner diameter and shape of the additional knurled ring match the outer diameter and shape of an adjusting ring of the optical lens. The additional knurled ring is movably connected with the outside of the adjusting ring of the optical lens. Since the additional knurled ring for the optical lens can be extended towards the front of the lens and beyond the front end of the optical lens, the interference of stray light with the imaging of the optical lens is blocked. Digital scale designations are engraved or printed on the outside of the additional knurled ring for optical lens, the position of the scale and the values of the designations are corresponding to the focal length, aperture, and focal range information of the optical lens. The front end with the enlarged outside diameter of the additional knurled ring for optical lens is movably connected with a cap, and the shape and size of the cap matches the shape and size of the front end of the additional knurled ring.

16 Claims, 5 Drawing Sheets

(56) References Cited

U.S. PATENT DOCUMENTS

| | | | |
|---|---|---|---|
| 2003/0011692 A1* | 1/2003 | Shore et al. | 348/240.3 |
| 2003/0192224 A1* | 10/2003 | Kirk | 42/124 |
| 2005/0141109 A1* | 6/2005 | Wahl et al. | 359/823 |
| 2006/0177206 A1* | 8/2006 | Takanashi | 396/27 |
| 2007/0147818 A1* | 6/2007 | Mori | 396/144 |
| 2008/0225234 A1* | 9/2008 | Bauer et al. | 352/140 |
| 2009/0199418 A1* | 8/2009 | LoRocco | 33/263 |
| 2009/0279192 A1* | 11/2009 | Harada et al. | 359/825 |
| 2010/0166403 A1* | 7/2010 | Neil | 396/79 |
| 2010/0226634 A1* | 9/2010 | Yamamoto | 396/80 |

* cited by examiner

ADDITIONAL KNURLED RING FOR OPTICAL LENS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to an additional knurled ring, and more particular to an additional knurled ring for optical lens adapted for incorporated with different kinds of optical adjusting rings.

2. Description of Related Arts

Nowadays, a conventional optical camera doesn't not include a knurled ring, so that it cannot be incorporated with optical adjusting assistance equipment which are a follow focus of the file lens and a converter. Therefore, the conventional optical camera has the capability and equipment for utilizing manual focus and autofocus to efficiently and precisely to adjust the optical lens of the conventional optical camera. In particular, while the digital conventional optical camera is utilized for shooting, the image shake, focus retardation, and noise generation from autofocus are common problems for the digital conventional optical camera so as to dramatically affect the quality of the images.

SUMMARY OF THE PRESENT INVENTION

A main object of the present invention is to provide an additional knurled ring for an optical lens that is movably connected to the outside of optical adjusting rings so as to overcome the problems of image shake, focus retardation, and noise generation from autofocus. In other words, the additional knurled rings provides the capability to incorporate adjustment assistance equipment, such as a follow focus of the file lens and a converter for producing stabilized images, quick focusing, and zero-noise.

Another object of the present invention is to provide an additional knurled ring for an optical lens, wherein the additional knurled ring comprises an annular portion and ring tooth radially distributed along the annular portion. The specification of the ring tooth include but is not limited to 0.8 modulus, and the inner diameter and shape of the additional knurled ring match the outer diameter and shape of the optical adjusting ring, such that the additional knurled ring movably connects to the outside of the optical adjusting ring.

Another object of the present invention is to provide an additional knurled ring for an optical lens, wherein the additional knurled ring for optical lens can be extended and enlarged towards the front of the optical lens and exceed the front end of the optical lens, such that the interference of the stray light for images from optical lens are blocked.

Another object of the present invention is to provide an additional knurled ring for an optical lens, wherein a digital scale designation are engraved or printed on the outside of the additional knurled ring for optical lens, and the position of the scale and the value of the designation are corresponding to the value of the focal length, aperture, and focal range information for the optical lens.

Another object of the present invention is to provide an additional knurled ring for an optical lens, wherein a cap is movably connected to the front and enlarged end of the additional knurled ring of optical lens for protecting the additional knurled ring and the optical lens, and the diameter and shape of the cap match with the diameter and shape of the front and enlarged end of the additional knurled ring of the optical lens.

Additional advantages and features of the invention will become apparent from the description which follows, and may be realized by means of the instrumentalities and combinations particular point out in the appended claims.

Accordingly, in order to achieve the above objects, the present invention provides a camera, comprising:

a camera body;

an optical lens connected to said camera body comprising at least one of optical adjusting rings; and at least one of additional knurled ring movably connected on the outside of said optical adjusting rings.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
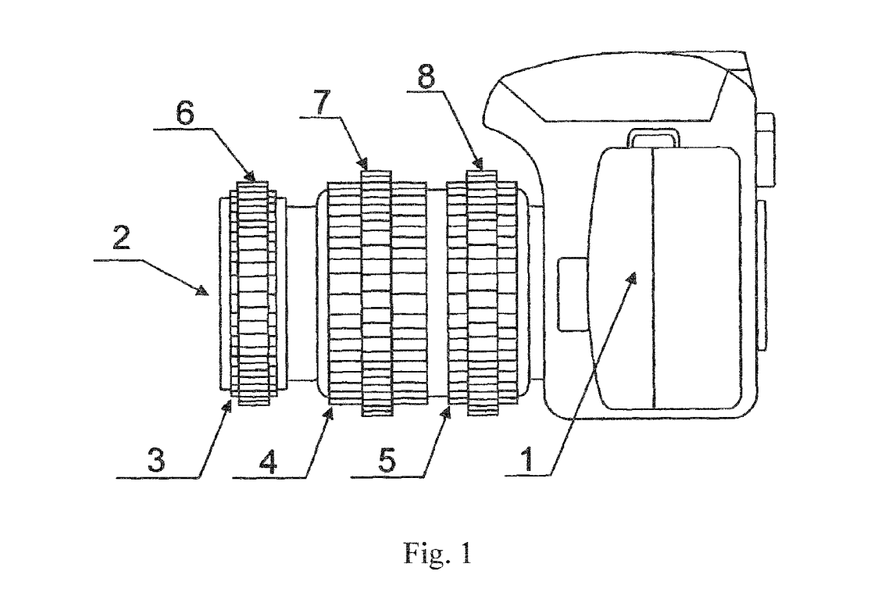
FIG. 1 shows a side view of an additional knurled ring for optical lens according to a first preferred embodiment of the present invention.

Referring to FIG. 1 of the drawings, an additional knurled ring for an optical lens according to a first preferred embodiment of the present invention is illustrated, wherein a camera comprises a camera body 1 connected to optical lens 2, at least one of additional knurled rings that is shown herein as a first additional knurled ring 6, a second additional knurled ring 7, and a third additional knurled ring 8, and at least one of the optical adjusting rings that is a focal length adjusting ring 3, a zoom ring 4, and a aperture adjusting ring 5, wherein the first additional knurled ring 6 is movably connected with the outside of the focal length adjusting ring 3, wherein the second additional knurled ring 7 is movably connected with the outside of the zoom ring 4, and the third additional knurled ring 8 is movably connected with the outside of the aperture adjusting ring 5. The inner diameter and shape of the first additional ring 6 match the outer diameter and shape of the focal length adjusting ring 3, and the inner diameter and shape of the second additional knurled ring 7 match the outer diameter and shape of the zoom ring 4. In other words, the inner diameter and shape of the third additional knurled ring 8 match the outer diameter and shape of the aperture adjusting ring 5.

Figure 2:
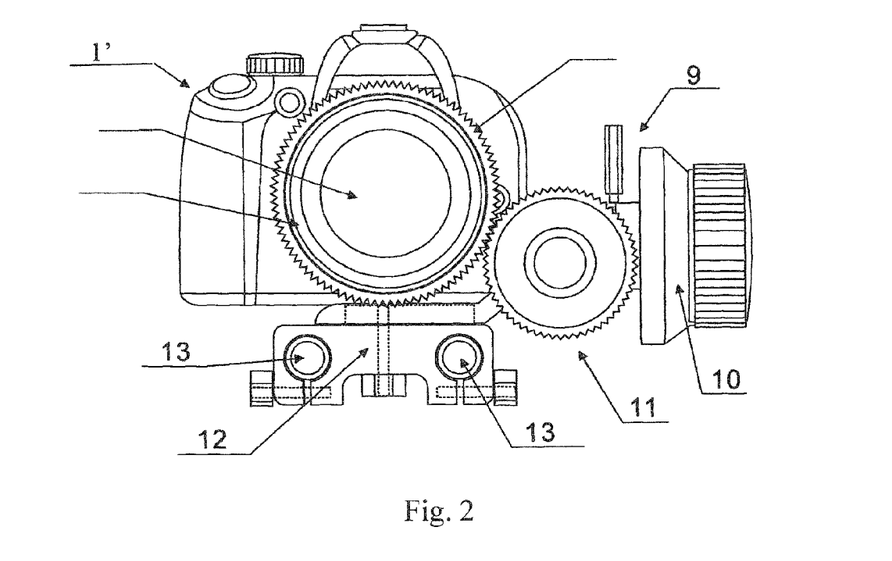
FIG. 2 shows a front view of an additional knurled ring for optical lens according to a second preferred embodiment of the present invention.

Referring to FIG. 2 of the drawings, an additional knurled ring for an optical lens according to a second preferred embodiment of the present invention is illustrated, wherein a camera comprises a camera body 1' movably connected to a follow focus 9 via a camera track 13, a follow focus gear 11 in contact with a first additional knurled ring 6', and a handgrip 10 adapted for being rotated so as to linkedly drive the follow focus gear 11 and the first additional knurled ring 6', in such manner that a focal length adjusting ring 3' can be adjusted. In other word, the handgrip 10 is able to be rotated so as to drive the follow focus gear being rotated to linkedly drive to rotate the first additional knurled ring 6'.

Figure 3:
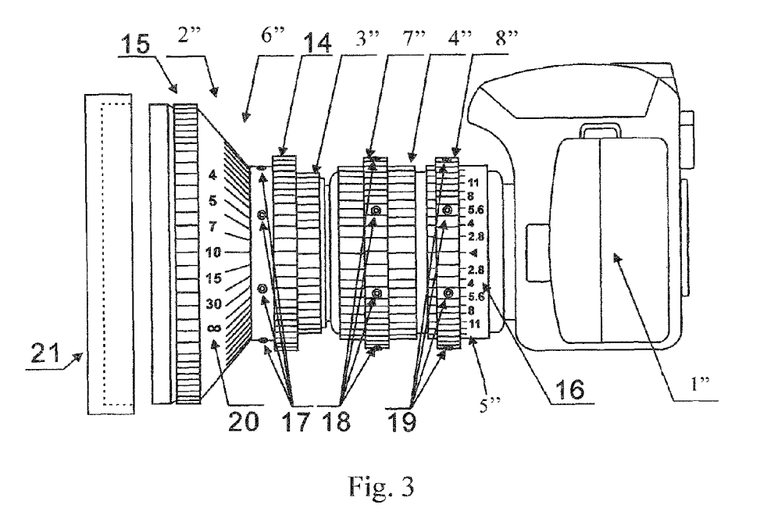
FIG. 3 shows a side view of an additional knurled ring for optical lens according to a third preferred embodiment of the present invention.

FIG. 3 shows a side view of an additional knurled ring for an optical lens according to a third preferred embodiment of the present invention, wherein a camera comprises a camera body 1" connected to an optical len 2", a first additional knurled ring 6" movably connected with the outside of a focal length adjusting ring 3", a second additional knurled ring 7" movably connected with the outside of a zoom ring 4", and a third additional knurled ring 8" movably connected with the outside of a aperture adjusting ring 5". The inner diameter and shape of the first additional ring 6" match the outer diameter and shape of the focal length adjusting ring 3", and the inner diameter and shape of the second additional knurled ring 7" match the outer diameter and shape of the zoom ring 4". In other words, the inner diameter and shape of the third additional knurled ring 8" match the outer diameter and shape of the aperture adjusting ring 5". The camera further comprises at least one of first screws 17 adapted for moveably connecting the first knurled ring 6" and the focal length adjusting ring 3", at least one of second screws 18 adapted for moveably connecting the second additional knurled ring 7" and the zoom ring 4", and at least one of third screws 19 adapted for movably connecting the third additional knurled ring 8" and the aperture adjusting ring 5". Moreover, the first additional knurled ring 6" comprises a front annular portion, front tooth 15 arranged at the front annular portion, a rear annular portion, and rear tooth 14 arranged on the rear annular portion, wherein the outer diameter of the front annular portion and the quantity of the front tooth 15 doesn't match the outer diameter of the rear annular portion and the quantity of the rear tooth 14, which is capable of adjusting different velocities and accuracies for the first additional knurled ring 6" based on the actual needs. The first additional knurled ring 6" further comprises a first digital scale designation 20 engraved or printed on the outside of the first additional knurled ring 6", wherein the position of the scale and the value of the designations for the first digital scale designation 20 are corresponding to the value of the focal length of the optical lens. The third additional knurled ring 8" comprises a second digital scale designation 16 engraved or printed on the outside of the third additional knurled ring 8", wherein the position of the scale and the value of the designations for the second digital scale designation 16 are corresponding to the value of the focal range information of the optical lens. It is worth mentioning that a camera further comprises a cap 21 movably connected on the front enlarged end of the first additional knurled ring 6" of the optical lens, and the shape and size of the cap 21 match the front enlarged end of the first additional knurled ring 6".

Figure 4:
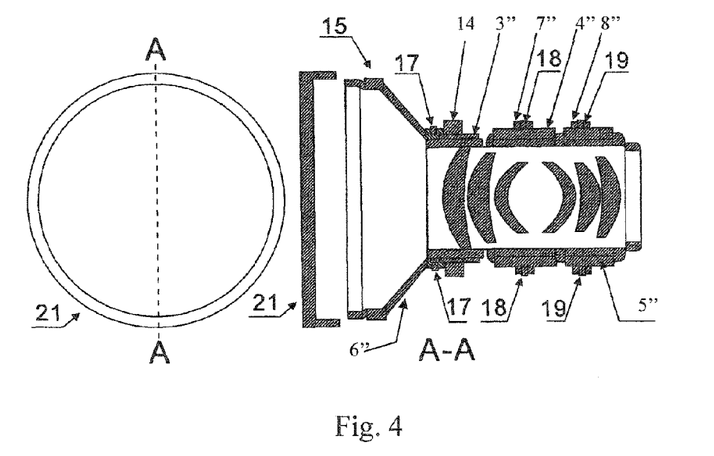
FIG. 4 shows an A-A sectional view of an additional knurled ring for optical lens according to a third preferred embodiment of the present invention.

FIG. 4 shows an A-A sectional view of the above third preferred embodiment of the present invention, wherein a camera comprises a first additional knurled ring 6'" movably connected with the outside of a focal length adjusting ring 3'", a second additional knurled ring 7'" movably connected with the outside of a zoom ring 4'", and a third additional knurled ring 8'" movably connected with the outside of a aperture adjusting ring 5'". The inner diameter and shape of the first additional ring 6'" match the outer diameter and shape of the focal length adjusting ring 3'", and the inner diameter and shape of the second additional knurled ring 7'" match the outer diameter and shape of the zoom ring 4'". In other words, the inner diameter and shape of the third additional knurled ring 8'" match the outer diameter and shape of the aperture adjusting ring 5'". The camera further comprises at least one of first screws 18 adapted for moveably connecting the first additional knurled ring 6'" and the focal length adjusting ring 3'", at least one of second screws 19 adapted for moveably connecting the second additional knurled ring 7'" and the zoom ring 4'", and at least one of third screws 19 adapted for movably connecting the third additional knurled ring 8'" and the aperture adjusting ring 5'". Moreover, the first additional knurled ring 6'" comprises a front annular portion, front tooth 15 arranged on a front annular portion, a rear annular portion, and rear tooth 14 arranged at the rear annular portion, wherein the outer diameter of the front annular portion and the quantity of front tooth 15 don't match the outer diameter of the rear annular portion and the quantity of rear tooth 14, which is capable of adjusting different velocities and accuracies for the first additional knurled ring 6'" based on the actual needs. It is worth mentioning that a camera further comprises a cap 21 movably connected on the front enlarged end of the first additional knurled ring 6'" of the optical lens, and the shape and size of the cap 21 matches the front enlarged end of the first additional knurled ring 6'".

Figure 5:
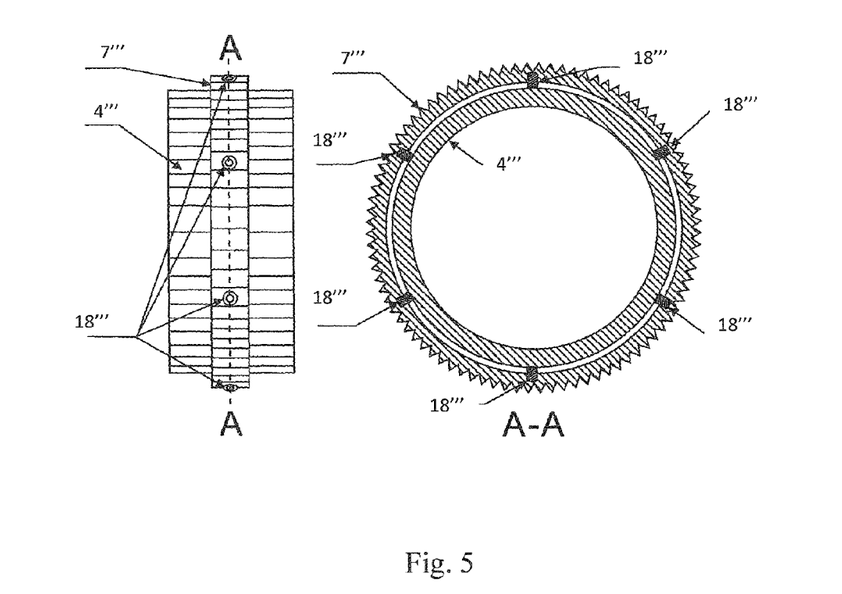
FIG. 5 shows an A-A sectional view of an additional knurled ring for optical lens according to a fourth preferred embodiment of the present invention.

As shown in FIG. 5, an additional knurled ring for an optical lens according to a fourth preferred embodiment of the present invention is illustrated, which is an alternative mode of an additional knurled ring for the optical lens of the third preferred embodiment. The camera comprises a second additional knurled ring 7'" movably connected with the outside of a zoom ring 4'" and at least one of second screws 18'" adapted for fixedly connected the second additional knurled ring 7'" and the zoom ring 4'". Due to the relative position of the second additional knurled ring 7'" and the second screws 18', the position of the axis for the zoom ring 4'" remains the same as the position of the axis for the second additional knurled ring 7'".

Figure 6:
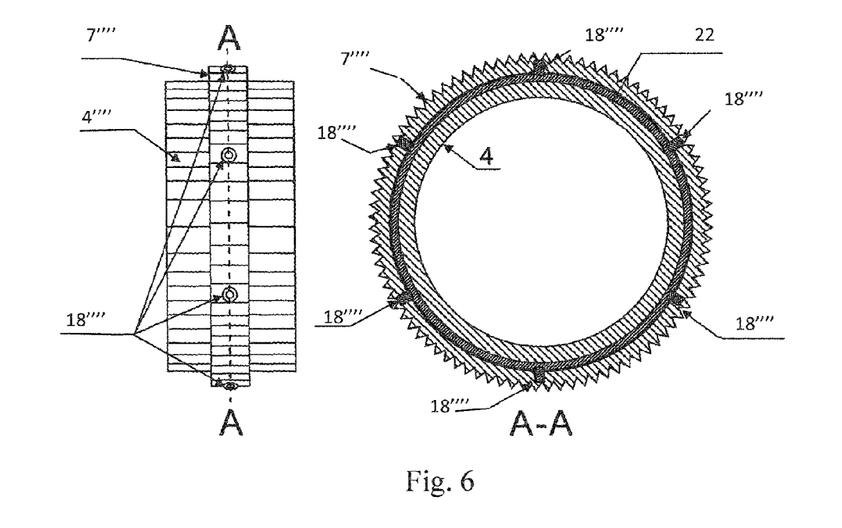
FIG. 6 shows an A-A sectional view of an additional knurled ring for optical lens according to a fifth preferred embodiment of the present invention.

FIG. 6 shows a sectional view of a fifth preferred embodiment of the present invention. The camera comprises a flexible ring 22 sandwichedly arranged between a second additional knurled ring 7"" and a zoom ring 4"". In other words, the second additional knurled ring 7"" is arranged on outside of the flexible ring 22, and the flexible ring 22 is arranged on outside of the zoom ring 4"". The camera further comprises at least one of second screws 18"", in such manner that the second additional knurled ring 7"" is fixedly connected to the flexible material and the zoom ring 4"" via the second screws 18"". Due to the relative position of the second additional knurled ring 7"" and the second screws 18"", the position of the axis for the zoom ring 4"" remains the same as the position of the axis for the second additional knurled ring 7"". Therefore, the flexible ring 22 is able to protect the zoom ring 4"" so as to increase the friction force between the second additional knurled 7"" and the zoom ring 4"".

Figure 7:
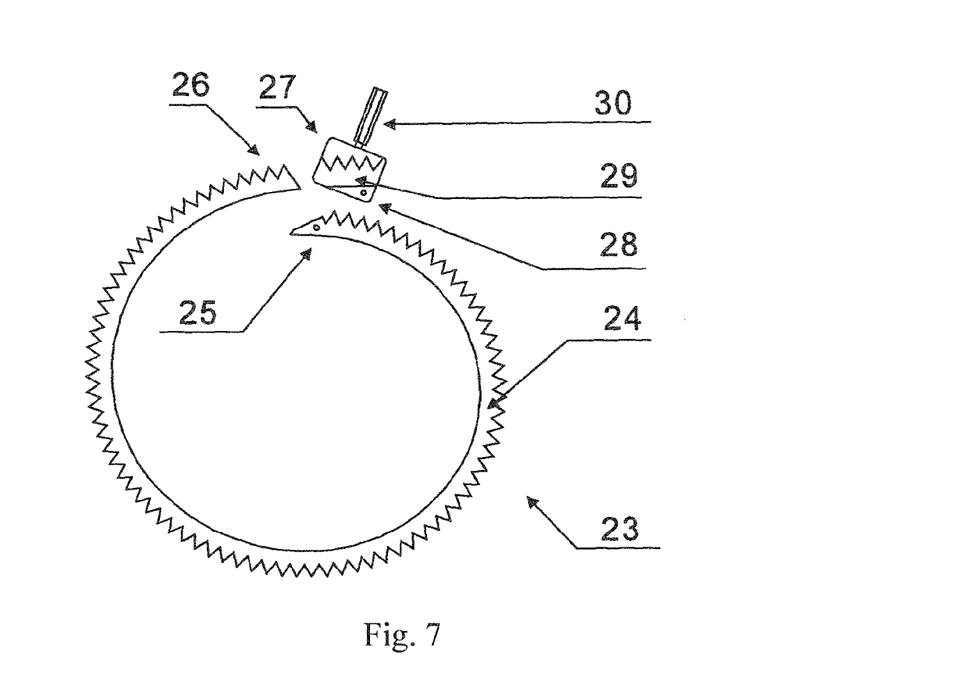
FIG. 7 shows a front view of an additional knurled ring for optical lens according to a sixth preferred embodiment of the present invention.

As shown in FIG. 7, an additional knurled ring for an optical lens according to a sixth preferred embodiment of the present invention is illustrated, wherein the camera comprises an additional knurled ring 23 which comprises a rack 24 made of flexible materials and a connection component 27 adapted for connecting the rack 24. The connection component 27 comprises a pin 28, a serrated slot 29, and a handle 30. The rack 24 comprises a front opening end 26 and a pin hole 25 arranged on the rear opening end of the rack 24. In such manner, the front opening end 26 of the flexible rack 24 is wedged into the serrated slot 29 of the connection component 27, and the pin 28 of the component 27 is inserted into the pin hole 25 of the flexible rack 24 so as to form a closed additional knurled ring 23. Therefore, the relative position of the front opening end 26 of the flexible rack 24 and the serrated slot 29 of the connection component 27 can be adjusted to change the diameter of the additional knurled ring 23 in order to match different diameters and functions of optical adjusting rings.

Figure 8:
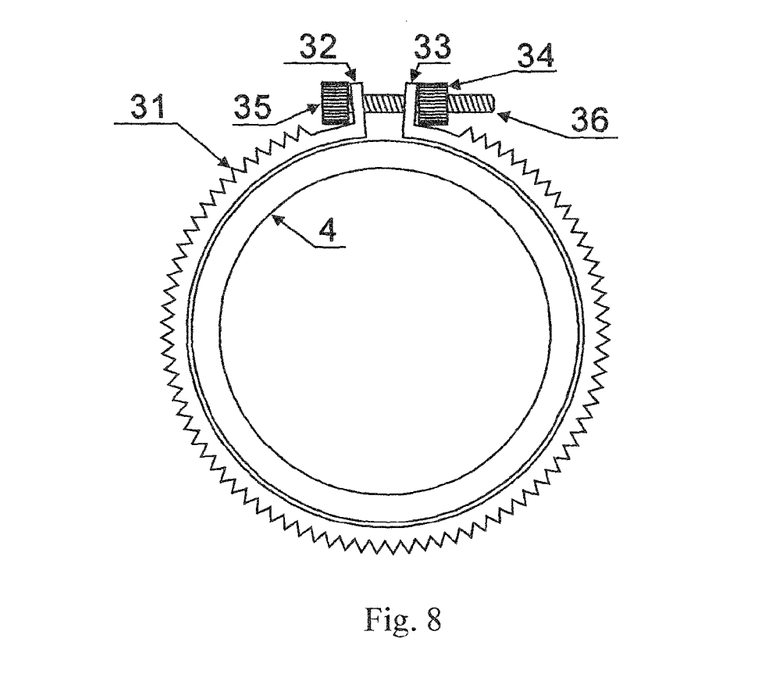
FIG. 8 shows a front view of an additional knurled ring for optical lens according to a seventh preferred embodiment of the present invention.

As shown in FIG. 8, an additional knurled ring for optical lens according to a seventh preferred embodiment of the present invention is illustrated, wherein the camera comprises an additional knurled ring 31 having an opening which comprises two ends that one end of the opening has a first protruded portion 32, and the other end of the opening has a second protruded portion 33. Each of the protruded portions is integrally extended from the additional knurled ring 31 and vertical to the surface of the optical lens. The camera further comprises a screw 35; a front end of the screw 36, and a nut 34, as well as that two through holes is arranged respectively on the first protruded portion 32 and the second protruded portion 33. Therefore, the front end of the screw 36 is parallelly passing through two through holes respectively which are arranged respectively on the first protruded portion 32 and the second protruded portion 33, such that the relative position of the screw 35 and the nut 34 can be adjusted to change the diameter of the additional knurled ring 31.

Figure 9:
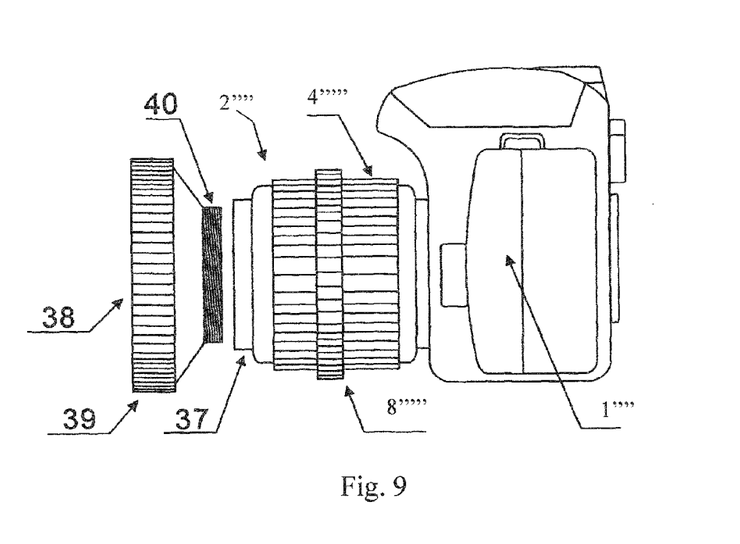
FIG. 9 shows a side view of an additional knurled ring for optical lens according to an eighth preferred embodiment of the present invention.

As shown in FIG. 9, an additional knurled ring for optical lens according to an eighth preferred embodiment of the present invention is illustrated. The camera comprises a camera body 1''' connected with an optical len 2''', a second additional knurled ring 8"" movably connected to outside of the zoom adjusting ring 4"", a detachable knurled ring 38, and teeth 39 arranged on outside of the detachable knurled ring 38. The detachable knurled ring 38 is backwardly and narrowly extended to form a protruded rear end 40 which comprises an outside screw thread on the outside of the protruded rear end 40. In addition, a front end 37 of the optical lens 2''' has an inside screw thread, such that the detachable knurled ring 38 movably connects with the optical lens 2''' via the connection between the outside screw thread of the detachable knurled ring 38 and the inside screw thread of the optical lens 2'''. Therefore, the diameter and shape of the protruded rear end 40 of the detachable knurled ring 38 matches the diameter and shape of the front end 37 of the optical lens 2'''.

Figure 10:
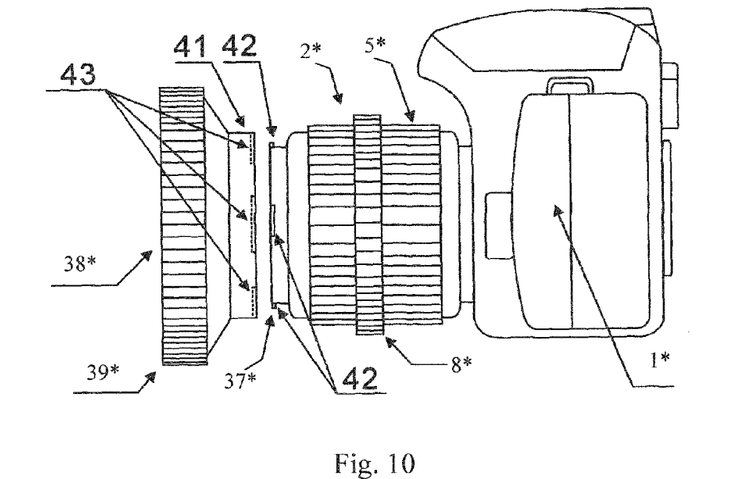
FIG. 10 shows a side view of an additional knurled ring for optical lens according to an ninth preferred embodiment of the present invention.

As shown in FIG. 10, an additional knurled ring for optical lens according to a ninth preferred embodiment of the present invention is illustrated, which is an alternative of the eighth preferred embodiment, wherein the camera comprises a camera body 1* connected with an optical len 2*, a second additional knurled ring 8* movably connected to outside of the zoom adjusting ring 4*, a detachable knurled ring 38*, and tooth 39* arranged on outside of the second additional knurled ring 38*. The detachable knurled ring 38* is backwardly and narrowly extended to form a protruded rear end 41 which comprises an inside buckle 43 arranged on the inside of the protruded rear end 41. In addition, a front end 37* of the optical lens 2* has an outside buckle 42 arranged on the outside of the front end 37* of the optical lens 2*, such that the detachable knurled ring 38* movably connects with the optical lens 2 via the connection between the inside buckle of the detachable knurled ring 38* and the outside buckle of the front end 37* of the optical lens 2*. Therefore, the diameter and shape of the protruded rear end 41 of the detachable knurled ring 38* match the diameter and shape of the front end 37* of the optical lens 2*.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A camera, comprising:
   a camera body;
   an optical lens connected to said camera body comprising two or more optical adjusting rings; and
   two or more additional knurled rings movably and detachably connected on the outside of said optical adjusting rings respectively, wherein said additional knurled rings are rotated to drive said optical adjusting rings to rotate respectively, so as to adjust said optical adjusting rings, wherein one of said additional knurled rings has a front annular portion, a rear annular portion, a front tooth formed at said front annular portion, and a rear tooth formed at said rear annular portion, wherein an outer diameter of said front annular portion and a quantity of said front tooth don't match with an outer diameter of said rear annular portion and a quantity of said rear tooth.

2. The camera, as recited in claim 1, further comprising a plurality of first screw, a plurality of second screws, and a plurality of third screws, wherein said optical adjusting rings are embodied as a first additional knurled ring, a second knurled ring, and a third knurled ring, wherein said optical adjusting rings comprises a focal length adjusting ring, a zoom ring, and an aperture adjusting ring, wherein said first additional knurled ring is detachably coupled at said focal length adjusting ring via said first screws, said second knurled ring is detachably coupled at said zoom ring via said second screws, said third knurled ring is detachably coupled at said aperture adjusting ring via said third screws.

3. The camera, as recited in claim 1, further comprising a camera track, a follow focus movably connected to said camera body via said camera track, a follow focus gear in contact with said first additional knurled ring, and a handgrip being actuated to be rotated to drive said first additional knurled ring through said follow focus gear, such that said handgrip is rotated to linkedly drive to activate said follow focus gear and said first additional knurled ring so as to adjust said focal length adjusting ring.

4. The camera, as recited in claim 2, wherein said first additional knurled ring is movably connected with an outside of said focal length adjusting ring when said first screws are spacedly affixed to said first additional knurled ring to press on said outside of said focal length adjusting ring so as to ensure said first additional knurled ring to coaxial with said focal length adjusting ring, wherein said second additional knurled ring is movably connected with an outside of said zoom ring when said second screws are spacedly affixed to said second additional knurled ring to press on said outside of said zoom ring so as to ensure said second additional knurled ring to coaxial with said zoom ring, and wherein said third additional knurled ring is movably connected with an outside of said aperture adjusting ring when said third screws are spacedly affixed to said third additional knurled ring to press on said outside of said aperture adjusting ring so as to ensure said first additional knurled ring to coaxial with said aperture adjusting ring.

5. The camera, as recited in claim 4, wherein the inner diameter and shape of said first additional ring match the outer diameter and shape of said focal length adjusting ring, and the inner diameter and shape of said second additional knurled ring match the outer diameter and shape of said zoom ring, and the inner diameter and shape of said third additional knurled ring match the outer diameter and shape of said aperture adjusting ring.

6. The camera, as recited in claim 5, wherein said first additional knurled ring comprises a first digital scale designation engraved/printed on the outside of said first additional knurled ring.

7. The camera, as recited in claim 5, wherein said third additional knurled ring comprises a second digital scale designation engraved/printed on the outside of said third additional knurled ring.

8. The camera, as recited in claim 5, further comprising a cap movably connected on the front enlarged end of said first additional knurled ring, and the shape and size of said cap matches the front enlarged end of said first additional knurled ring.

9. The camera, as recited in claim 5, further comprising a flexible ring sandwichedly arranged between each of said additional knurled ring and each of said optical adjusting rings to increase a friction between said additional knurled ring and said optical adjusting ring, wherein said first screws are affixed at said first additional knurled ring to said flexible ring around said focal length adjusting ring, wherein said second screws are affixed at said second additional knurled ring to said flexible ring around said zoom ring, wherein said third screws are affixed at said third additional knurled ring to said flexible ring around said aperture adjusting ring.

10. The camera, as recited in claim 5, wherein each of said additional knurled rings which comprises a rack made of flexible materials and a connection component connected to said rack, wherein said connection component comprises a pin, a serrated slot, and a handle, wherein said rack comprises a front opening end and a pin hole arranged on the rear opening end of said rack, wherein a diameter of said additional knurled ring is adjustable to match with the outer diameter of said optical adjusting ring.

11. The camera, as recited in claim 5, wherein each of said additional knurled rings has an opening that one end of the opening has a first protruded portion, and the other end of the opening has a second protruded portion, wherein said first and second protruded portions are integrally extended from said additional knurled ring and vertical to the surface of said optical lens, wherein a diameter of said additional knurled ring is adjustable to match with the outer diameter of said optical adjusting ring.

12. The camera, as recited in claim 5, further comprising a detachable knurled ring, tooth arranged on outside of said detachable knurled ring, wherein said detachable knurled ring is backwardly and narrowly extended to form a protruded rear end which comprises an outside screw thread on the outside of said protruded rear end, wherein said additional knurled ring is movably connected to the outside of said optical adjusting ring; and a front end of said optical lens has an inside screw thread for movably connecting said detachable knurled ring and said optical lens.

13. The camera, as recited in claim 6, wherein the position of the scale and the value of the designations for said first digital scale designation are corresponding to the value for the focal length of said optical lens.

14. The camera, as recited in claim 10, wherein said front opening end of said flexible rack is wedged into said serrated slot of said connection component as well as that said pin of said connection component is inserted into said pin hole of said flexible rack so as to form said closed additional knurled ring.

15. The camera, as recited in claim 11, further comprising a screw, a front end of said screw, and a nut, wherein two through holes are arranged respectively on said first protruded portion and said second protruded portion such that the front end of said screw is parallelly passing through said two through holes respectively for adjusting to change the diameter of said additional knurled ring.

16. The camera, as recited in claim 12, wherein said protruded rear end comprising an inside buckle arranged on the inside of said protruded rear end, wherein said front end of said optical lens has an outside buckle, wherein the connection between said inside buckle of said detachable knurled ring and said outside buckle of said optical lens is adapted for movably connecting said detachable knurled ring and said optical lens.

* * * * *